US008478104B2

(12) United States Patent
Meindl

(10) Patent No.: US 8,478,104 B2
(45) Date of Patent: Jul. 2, 2013

(54) COPY SECURE MULTIMEDIA RFID WITH ANALOG TRANSMITTER

(75) Inventor: Reinhard Meindl, Gratkorn (AT)

(73) Assignee: NXP B.V., Eindhoven (NL)

( * ) Notice: Subject to any disclaimer, the term of this patent is extended or adjusted under 35 U.S.C. 154(b) by 432 days.

(21) Appl. No.: 12/649,850

(22) Filed: Dec. 30, 2009

(65) Prior Publication Data

US 2011/0158608 A1 Jun. 30, 2011

(51) Int. Cl.
*H04N 9/80* (2006.01)

(52) U.S. Cl.
USPC .......................................... 386/239; 386/252

(58) Field of Classification Search
None
See application file for complete search history.

(56) References Cited

U.S. PATENT DOCUMENTS 5,406,261 A * 4/1995 Glenn .......................... 340/571
2005/0222864 A1* 10/2005 J'maev .............................. 705/1
2006/0258289 A1* 11/2006 Dua ............................ 455/41.3
2007/0009225 A1* 1/2007 Yokota et al. .................. 386/52
2007/0113081 A1 5/2007 Camp
2009/0168800 A1 7/2009 Leinonen et al.
2009/0203399 A1* 8/2009 Rofougaran .............. 455/556.1

FOREIGN PATENT DOCUMENTS

WO 2007/060547 A2 5/2007

* cited by examiner

*Primary Examiner* — William C Vaughn, Jr.
*Assistant Examiner* — Asher Khan

(57) ABSTRACT

A portable RFID device includes an analog modulation radio frequency transmitter and a data storage holding audio data files. In response to user entered commands the device retrieves the audio data files, applies digital to analog conversion to generate analog audio signals, and transmits the analog audio signals through the analog modulation RF amplifier. Optionally, the analog modulation RF amplifier is a frequency modulation (FM) modulator and transmitter, optionally using a UHF broadcast FM band. The transmitted analog modulated RF signal is received and played by a receiver and playback device proximal to the transmitter. Optionally, a locking operation is applied after storing the multimedia files, preventing subsequent altering of the files.

16 Claims, 2 Drawing Sheets

COPY SECURE MULTIMEDIA RFID WITH ANALOG TRANSMITTER

TECHNICAL FIELD

The technical field relates generally to radio frequency identification (RFID) tags.

BACKGROUND

Selecting a distributable storage media and coding format for distributing copyrighted content has long presented a problem for copyright owners, namely that various objectives and criteria used in the selection process are, at least within the universe of currently available media and format, directly counter to one another.

To illustrate, MPG-3 is one well known coding scheme, and has many benefits such as high reproduction quality, easy translation from one medium to another, and ease of distribution. However, distributing content as MPG-3 files provides little, if any, practical and effective protection against copying. It has no such protection because copying an MPG file because as long the copying does not lose any bits each copy is identical to the original. Numerous copy-protect techniques for MPG-3 and equivalent coding schemes have been proposed, and attempted, but none have proved effective, practical and acceptable in the marketplace of wide-distribution media. For example, encryption may, at least theoretically, make copying more difficult, but it has inherent costs as well as inherent weaknesses. First, encryption makes playback more of a nuisance because specialized playback decoders, as well as reliable means of distributing playback authorization codes, are needed. Second, regardless of the strength of the encryption, a playback device must have a digital-to-analog converter (DAC), and the DAC must receive the decrypted playback data. Since the DAC of many playback devices is, or may be made accessible to skilled persons, the encryption is easily defeated.

SUMMARY

Devices according to various exemplary embodiments provide, among other features and benefits, economical and practical means for wide distribution of multimedia content, combined with providing a very high difficulty for high quality unauthorized copying.

One example device according to one exemplary embodiment may comprise a housing structure containing a radio frequency identification (RFID) receiving and decoding circuit to receive a given RFID signal and extract digital data from the RFID signal, a control unit to perform functions according to given commands in the extracted RFID digital data, a data storage to store a multimedia content data, an analog-to-digital converter (ADC) to convert a retrieved digital multimedia content data from the data storage unit into an analog baseband signal, and an RF modulator/transmitter to transmit—through the device housing—an RF carrier that is modulated by the analog baseband signal.

According to one aspect of one or more exemplary embodiments, the device controller may be configured to detect given multimedia write commands within the extracted RFID digital data and, in combination with the data storage, to store multimedia content data from the extracted RFID digital data.

According to one aspect of one or more exemplary embodiments, at least one of the controller and the data storage unit may be structured to be switchable from an unlocked writeable mode to a locked non-writable mode, and may be structured such that an unlocked writeable mode includes a capability of storing, in accordance with a write command in the extracted RFID digital data, a multimedia content data in the extracted RFID digital data, and may be structured such a locked mode disables one or more unlocked mode capabilities of storing a multimedia content data.

According to one aspect of one or more exemplary embodiments, the controller and the data storage unit may be structured to have a read mode or a read configuration capable of, in response to a given read control data received at the controller, reading a multimedia content data from the data storage unit and generate, in response, a multimedia playback data. Further according to one aspect, the controller may be structured to be capable of extracting the given read control data from, or detecting the given read control data in the RFID digital data. Further according to one aspect, a manually operable user interface structure may be arranged on the device housing structure, and have a structure for detecting a manual motion and converting the manual motion into a user interface input signal. Further according to one aspect the controller may be structured to be capable of receiving the user interface input signal and converting the signal into the read control data.

According to one aspect of one or more exemplary embodiments, the controller and the A/D converter may be structured to convert the multimedia playback data to an analog baseband multimedia signal.

According to one aspect of one or more exemplary embodiments, the analog RF modulator/transmitter may be structured to generate an analog RF carrier signal, modulate the analog RF carrier signal with the analog baseband multimedia signal, generate and transmit a resulting modulated RF carrier signal.

According to one aspect of one or more exemplary embodiments, the analog RF modulator/transmitter may be structured to generate an analog RF carrier signal within a conventional broadcast RF frequency band, and to frequency modulate (FM) the analog RF carrier signal with the analog baseband multimedia signal, generate and transmit a resulting FM RF signal detectable and playable by a conventional broadcast band FM radio receiver.

According to one aspect of one or more exemplary embodiments, a power supply within the housing structure includes a power converter to convert a raw power signal to the internal supply power.

According to one aspect of one or more exemplary embodiments, a power source within the housing structure comprises one or more of a battery and a power coupler to extract a power from an input RF signal and to generate the raw power signal in response.

Example methods according to one or more of the various example embodiments may include receiving an RFID signal at an RFID receiver/decoder within a portable housing, extracting an RFID data from the RFID data, detecting a multimedia write command and a multimedia content data in the RFID data and, in response, storing the multimedia content data in a portable storage within the portable housing. Example methods according to one or more of the various example embodiments may further include receiving a read command signal and, in response, reading a multimedia content from the data storage, converting the retrieved data to an analog multimedia signal, modulating a carrier signal by the analog signal and transmitting the modulated signal.

According to one aspect, example methods according to various exemplary embodiments may include receiving a lock command signal within the device housing and, in response, disabling the device from altering a multimedia content stored prior to receiving the lock command.

The above-summarized illustrative examples of embodiments and of illustrations, as well as the above illustrative advantages, features and benefits of each are not intended to be exhaustive or limiting. Other advantages of the various exemplary embodiments will be apparent from the various embodiments and aspects that are further described with illustrative detail, and persons of ordinary skill in the art will, upon reading this disclosure, readily identify further variations within the scope of the appended claims, as well as additional applications.

DETAILED DESCRIPTION

Figure 1:
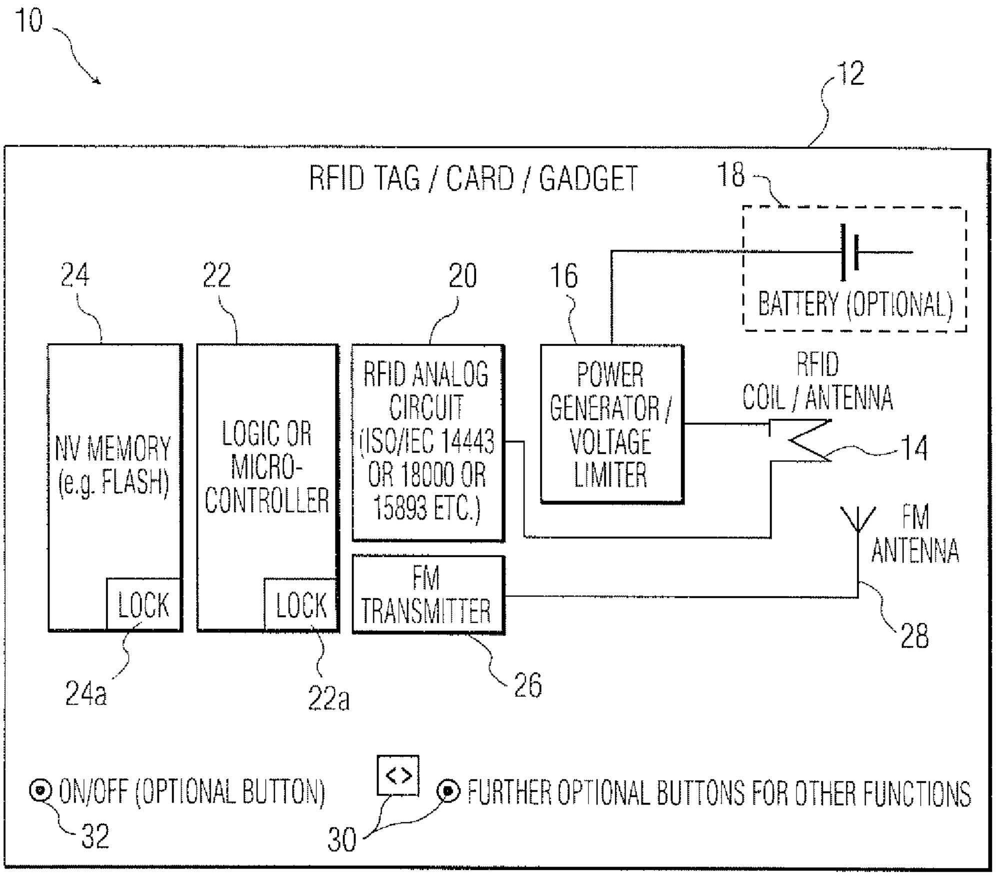
FIG. 1 shows one illustrative example functional block schematic of one example lockable multimedia analog modulated transmission playback device according to one or more various exemplary embodiments.

Various illustrative examples of portable media content players having one or more exemplary embodiments are described. The specific examples are only for illustrative purposes, to further assist a person of ordinary skill in the arts identified in the Technical Fields section of this disclosure in forming an understanding of the concepts sufficient for such a person, applying the knowledge and skills such person possesses, to practice the invention. It will be understood, though, that the scope of structures and methods for practicing one or more of the various embodiments is not limited to these specific illustrative examples.

The figures are provided to assist persons of ordinary skill in the art, by way of graphical illustrations of specific described illustrative examples, in forming a clear understanding of the concepts to practice various exemplary embodiments. It will be understood, though, that the figures are not necessarily production specifications as, for example, graphical symbols may be sized and placed for ease of viewing and not to represent a relative importance of functions, or a relative location or size of structure.

To avoid obscuring novel features and aspects, unnecessary details of various technical background that are known to persons of ordinary skill in the art, such as, for example, RF design criteria and methods, and circuit simulation tools are omitted.

Example embodiments and aspects may be described separately, and as having certain differences. Separate description or description of differences, however, does not necessarily mean the respective embodiments or aspects are mutually exclusive. For example, a particular feature, function, or characteristic described in relation to one embodiment may be included in, or adapted for other embodiments.

One example device according one or more of the general embodiments may comprise a portable playback device preferably, but not necessarily, small and light enough to be secured in a packet or other attachment adhered on, for example, an inside over of a magazine or other distributed periodical. It will be understood that these examples of packaging and distribution means are, as stated, only examples. A wide range of various and alternative packaging structures and forms, and associated modes of distribution of portable playback devices according to various embodiments will be apparent to persons of ordinary skill in the art based on this disclosure. The housing encloses circuitry implementing, in various hardware arrangements that may be obvious to persons of ordinary skill in the relevant art based on a reading of this entire disclosure, an RFID receiver, a digital controller, a data storage, digital-to-analog converter (DAC), an analog modulated RF modulator/transmitter and, of course, a power supply.

In overview, according to various exemplary embodiments, one or more multimedia files such as, for example MPG-3 files, are stored in the device's data storage. According to aspect, the multimedia files are stored by initializing the data storage once before distribution to end users and, and after the initialization, a locking feature is utilized wherein any further digital access to the digital music data is permanently disabled and made impossible. In addition, physical and/or cryptographic means may be used for further protecting the multimedia files in the data storage against all external read/write accesses. Playback is effected by the device performing an internal reading of the multimedia files, converting the files to analog multimedia signals via the internal DAC, and transmitting the analog multimedia signals through the analog modulated RF modulator/transmitter for reception and playing on an analog modulation RF receiver and playing device. The analog modulated RF modulator/transmitter may employ a conventional broadcast band carrier wave and modulation such as, for example, FM transmission within the commercial broadcast UHF FM band. The playback device may, for example, be an automobile FM radio. The transmitted analog modulated RF signal preferably has a power sufficient to carry the signal a distance of, for example, only a few meters. This prevents the analog modulated RF signal by which devices according to the various embodiments transmit the playback multimedia signal to the user's playback device from interfering with other's playback devices, e.g., other driver's automobile-mounted FM radios.

As will be understood, the various embodiments' audio transmission via an internal analog modulated, e.g., FM radio transmitter, provides, among other features and benefits, the advantage that no digital copying of the contents is possible. Copying of the FM radio transmitted music from, for example, the automobile radio speakers is possible but should not be an issue since the FM transmitted audio suffers under quality decrease. This, in turn, provides additional benefit such as, for example, no complicated DRM being required to protect identical contents copies.

Further, because of the light weight and small size attainable through implementing devices according to the various embodiments using even conventional, commercially available RFID tag fabrication technology provides devices that are easily portable. According to one aspect, devices having various exemplary embodiments may be structured to be removably attached, e.g., by Velcro™ or other available securing means, to any existing example of the type of analog modulation RF signal receiver for which the analog transmitter within the device is configured. According to one aspect, this may be an FM radio and, accordingly, devices according to this and other aspects may be removably attached to any existing FM radio receiver, removed again and carried around from, for example, the user's home, to the office or into the car. The consumer can use the contents easily, at any FM radio and also re-sell the tag without further digital DRM measures.

Example housings for devises according to various exemplary embodiments may be, but are not necessarily, shaped and dimensioned to be hand-held and, for example, to fit within other goods and distribution media such as, for example, magazines. The housing's form, structure, and material is a design choice readily made, in view of this disclosure, by persons of ordinary skill in the relevant arts based on, for example outer size constraints, environmental factors, aesthetic considerations and volume requirements, as well as RF transmittance of the housing and, further, manufacturability and cost considerations.

It will be understood that other than requiring an acceptable RF transmittance at the frequency(ies) used by the device's analog modulated RF transmitter, as will be described in greater detail at later sections, the structure and material of the housing is not necessarily particular to practicing according to the embodiments. Ordinary RFID housing design practices, applied in view of the above-described requirement for RF transmittance, may be employed.

Example devices according to one or more various exemplary embodiments enclose an RFID receiving and decoding circuit configured to receive a given RFID signal, decode and extract a received digital data from the signal. With respect to the characteristics of the RFID signal, the specific carrier and modulation scheme, as well as the coding scheme employed in the RFID signal, are not necessarily particular to the embodiments. For the modulation scheme, bit rate and RF carrier frequency of the RFID signal may, in view of the present disclosure, be easily determined or selected by persons of ordinary skill in the relevant art by, for example, applying conventional RF design and digital communication design practices in the implementing of a device according to the present disclosure.

The circuit topology and the hardware structure of the RFID receiving and decoding circuit may, likewise, be implemented by combining conventional RF circuit design skills possessed by persons of ordinary skill in the relevant arts with the present disclosure, in view of particular product and system specifications the user intends the device o meet.

Continuing with the description of example devices according to one or more exemplary embodiments, the specific protocol used in the RFID digital data for communicating, for example, commands to the device and data content for storage in the device may be a design choice, readily made by persons of ordinary skill in the relevant arts, based on this disclosure in view of the particular performance and compatibility specifications desired for the particular device. For illustrative example, a packet-type protocol may be used, having, for example, any of various ID header field formats, command fields, data content fields and, if desired, error correction fields. As a further illustrative example, one or more standard protocols may be employed, as well as various customized or proprietary protocols that a person of ordinary skill in the art can readily design or adapt, in view of the present disclosure, to implement devices and systems according to the exemplary embodiments. Particular example protocols that may be, but are not necessarily used are identified in greater detail at later sections of this disclosure.

Continuing with the description of example devices according to various exemplary embodiments, a control unit and a data storage unit within the housing may be coupled to the RFID receiving and decoding circuit, to receive, decode and detect various given commands from the extracted RFID input data, write multimedia content data, as well as commands, extracted from the RFID input data, and to read multimedia content and other data from the data storage unit, and perform other functions in accordance with the received commands.

It will be understood that the terms "control unit" and "data storage unit" are defined herein as functional units, and not necessarily separate hardware "units." For example, an integrated circuit (IC) chip may implement the data storage unit as well as some or all functions of the control unit. Therefore, within the description, at instances where the collected or cooperating functions of the controller unit and the data storage unit are described, the collective functions may be referred to as the "controller and data storage unit."

According to various aspects, the controller unit may be implemented by, for example, a conventional RFID technology microcontroller or equivalent state machine capable of, for example, decoding a given set of programming instructions and user playback instructions received via, for the RFID input signal as well as, according to one or more aspects, playback instructions received via one or more manual user interface structures that may be arranged on the device housing, and carrying out the operations defined for each of the programming and playback instructions. Illustrative examples include controlling a writing of content into the data storage unit, controlling a reading of content from the data storage unit, and controlling or performing various decoding operations, as well as controlling DAC operations and RF analog transmission operations to perform play back of multimedia content multimedia.

Preferably, for purposes of power conservation, the data storage unit may be implemented by a non-volatile random access memory (NVRAM), using any available NVRAM technology. Selection of the capacity and other performance and function parameters of the data storage unit may be readily performed by persons of ordinary skill in the relevant arts, using conventional engineering design practices known to such persons to this disclosure in combination with the disclosure, and the intended specifications and environment of the particular product practicing one or more of the embodiments. Example considerations include the specific type(s) of multimedia content the particular device is intended to store, the amount of such multimedia content, the desired replay quality, the specified physical dimensions of the device, the target cost of the device, and the state of the memory technology extant at the time.

As also previously described, example devices according to various exemplary embodiments include a DAC to convert retrieved multimedia content into an analog multimedia playback signal, and an analog modulator/transmitter unit to modulate a given radio frequency (RF) carrier signal by the analog multimedia signal, and generate and transmit a corresponding analog modulated RF multimedia signal. The DAC may be incorporated into the analog modulator/transmitter unit, or may be separate hardware unit.

According to one aspect, the analog multimedia playback signal may, for example, be a baseband audio signal. As will be understood by persons of ordinary skill in the art upon reading this disclosure, a low pass filter, to smooth the analog multimedia playback signal and remove spurious signals prior to input to the analog modulator/transmitter unit, may be included on the DAC output.

According to one aspect, the analog modulator/transmitter unit may generate a carrier signal within a frequency band allocated to, and used by commercial frequency modulated (FM) broadcast radio. The particular frequency band for such FM broadcasts may depend on the location at which the device is used and which, if any, laws or regulations control allocation and use of the frequency spectrum at that location. For example, in the United States, the FM broadcast band is currently 88 megahertz to 108 megahertz, sub-allocated at 200 KHz per channel. Accordingly, example devices practicing various exemplary embodiments, and for doing so within the United States may have an analog modulator/transmitter unit structured and configured to modulate an FM carrier frequency at, for example, one of the channel center frequencies of the 200 KHz channels in the 88 megahertz to 108 megahertz band.

In an illustrative example implementation for use in the allocated FM broadcast band within the United States, the analog modulator/transmitter unit may be structured and configured to generate the analog modulated RF multimedia signal as an FM modulated signal within one of the 200 KHz channels, preferably at a power level meeting United States regulations, and otherwise set to not interfere with FM broadcasts within that channel or any other FM broadcast channel.

As is readily understood by persons of ordinary skill in the art, the transmitted signal power of the analog modulated RF multimedia signal must be sufficient to be received with acceptable quality at the user's playback device, e.g., the user's automobile FM radio, but low enough to not interfere with other persons' broadcast receiver and playback devices, e.g., other drivers' car radios. power manner compliant with modulator/transmitter unit According to various embodiments, in the controller unit and the data storage unit may be structured to have at least two modes of operation, and these at least two modes are referenced herein as an "unlocked mode" and a "locked mode." The terms "unlocked" and "locked" may encompass, respectively, a given capability to alter an existing stored multimedia content, e.g., store new content, and a disabling of such capability, thereby locking the multimedia content from alteration.

According to one aspect of example devices and methods having one or more exemplary embodiments, and as will be described in greater detail at later sections, a distributing entity may receive an unlocked device from a supplier, store a given multimedia content in the device, and then lock the device using various methods according to one or more exemplary embodiments. As will be further understood, the distributing entity may also load, for example, customized playback programs into memory regions of the data storage unit reserved or allocated for machine code executable by the controller unit. The distributing entity may then distribute the locked devices to end users for selective playback, practicing one or more of the various exemplary embodiments, as described in greater detail at later sections.

A wide variety of implementations of locking aspects according to exemplary embodiments will be obvious to persons of ordinary skill in the relevant arts upon reading this disclosure. As one illustrative example, a locking feature may be constructed using permanent fusible links according to conventional fusible link technology and current NVRAM technology, combined with the present disclosure.

According to one aspect, devices according to various exemplary embodiments may include an available channel search feature implemented by, for example, an instruction set for the controller unit, to search for an unused broadcast channel such as, for example, an unused FM radio frequency band, to automatically tune the local oscillator of the analog modulator/transmitter to and transmits at the unused frequency to the user's broadcast receiver and playback device.

According to one aspect, a video display such as, for example, a passive liquid crystal display (LCD) alphanumeric display may be arranged on the device housing to display the frequency band to which the device is tuned. Further to this aspect, the user may tune his or her broadcast receiver and playback device, e.g. his or her car radio, to the displayed frequency.

Referring now to the figures, illustrative examples of and among the various arrangements, architectures, systems and structures for practicing one or more of the various example embodiments will be described.

FIG. 1 shows one example functional block diagram representation of one illustrative example implementation 10 of a multi-media playback device having one or more of the various exemplary embodiments. The multi-media playback device implemented by the example 10 may be in the form of or part of an RFID tag, a smart card or any similar portable media apparatus. The multimedia playback device may, further, be in the form of, part of, or arranged within or, for example, on any other object, preferably but not necessarily a hand-portable object, in which or on which a user may wish to have a multimedia playback device having the capability of playback by transmitting its multimedia content in an analog modulated waveform that is detectable and playable on a broadcast band analog receiver-playing device.

For purposes of describing example operations of the illustrative example 10, it will be assumed that the broadcast band analog receiver-playing device with which the example 10 interacts for purposes of playback is an automobile-mounted FM receiver, configured for the United States FM broadcast band of 88 megahertz to 108 megahertz, with channel widths of 200 KHz, spaced and centered according to the United States channel frequency allocation. It will also be assumed that this is only an example for purposes of describing example operations and examples of particular parameters. Persons of ordinary skill in the relevant arts will readily understand, and be capable of, translating the described example operations and examples of particular parameters to any other broadcast band, any other channel allocation, and any other broadcast analog modulation scheme.

The example 10 preferably, but not necessarily, includes a housing 12 which, as previously described, may be any shape or size desired, so long as the internal volume is sufficient to contain the hardware implementing the depicted functional blocks. Persons of ordinary skill in the relevant art can readily ascertain such volume requirements based on the present disclosure. Purposes of the housing include convenience, protection of the hardware forming the depicted functional blocks, and preventing unauthorized access to data storage hardware storing multimedia content and copying of such content. The material of the housing may be readily selected by persons of ordinary skill in the art, based on the present disclosure in view of the power and carrier frequency of the internal analog modulation transmitter of the device, and the frequency of the RFID signal for programming and controlling the device.

Continuing to refer to FIG. 1, the example 10 further includes an RFID coil or equivalent antenna structure 14. The particular form of the RFID antenna structure 14 is a design choice, readily made by persons of ordinary skill in the art based on the desired center frequency of the RFID signal, in view of hardware constraints specific to the particular application. A power converter 16 has one of two optional configurations. The configuration depends on whether the device implemented by the example 10 is an active device, having an internal power source, such as the depicted optional battery 18, or a passive device that obtains internal power from the RFID signal received by the RFID antenna structure 14. The various benefits of configuring a device as an active RFID device as opposed to a passive RFID device, or visa versa, are well known to persons of ordinary skill in the art and, except where pertinent to practicing according to the embodiments, further detailed description is omitted. With respect to choosing between an active RFID and a passive RFID device in practicing the various exemplary embodiments, a factor specific to such practicing is the internal analog modulated RF transmitter such as, for example, the depicted example 26. As will be understood, the internal analog transmitter such as item 26 will consume power when operating, which includes the entire duration in which the multimedia content is being played back. As will also be understood, the amount of power (i.e., the watts) consumed by the analog modulated RF transmitter, will be dependent on the efficiency of the final amplifier stage(s) of the analog modulated RF transmitter 26, the gain of the transmitter antenna 28, and the desired range of the device, e.g., the intended maximum distance from the device to the contemplated broadcast band receiver and playback device for the user to experience the playback multimedia content, e.g., the automobile radio for listening to, for example, a music content of the device. All of these factors are readily understood by persons of ordinary skill in the art and, accordingly, such persons can readily select a configuration for, and appropriate hardware implementation, of the power converter 16 and, if used, the batter 18.

Continuing to refer to the power converter 16 of the FIG. 1 example 10, it will be understood that, according to one aspect, a combined active/passive configuration may be implemented, having both an internal batter such as item 18 and a capability to extract power from an RFID signal.

Referring again to FIG. 1, an RFID analog circuit 20 connects to the RFID antenna structure 14 to receive and demodulate the RFID signal. The general structure of, and the parameters for the RFID analog circuit are not particular to practicing according to the various embodiments. For example, the structure and parameters may be readily determined and implemented by persons of ordinary skill in the art based on the present disclosure, and in further consideration of the desired RFID center frequency, modulation scheme, and bit rate. The RFID analog circuit 20 may, for example, be configured for operation according to standards such as, for example, ISO/IEC 14443, 18000, 15693, or any other standards known in the RFID arts.

As previously described, devices and methods according to the various exemplary embodiments are contemplated as using any RFID bit protocol known in the relevant art, or later developed, provided the protocol can support a desired range and rate of command and programming input to the controller 22, which is described in greater detail at later sections. As will be understood by persons of ordinary skill in the art upon reading the present disclosure, factors for consideration in selecting an RFID protocol, or in configuring a customized or proprietary protocol, are the range of programming and playback commands that will be used and, in view of contemplated applications that include storing a large quantity of multimedia content in the device, the efficiency of the protocol in performing such storage operations.

Continuing to refer to FIG. 1, in the example 10 a controller 22 and a preferably non-volatile memory or data storage unit 24 are arranged within the example housing 12. The controller 22 and the data storage unit 24 may, in accordance with standard circuit design practices, be implemented as a single hardware unit, or as separate hardware units, or as a distributed function set over a plurality of hardware units (not separately shown). Specific illustrative example functions that may be performed by the controller 22 are described in greater detail in reference the example operations graphically depicted at FIG. 2. The controller 22 may be, for example, any Von-Neumann or equivalent architecture state machine configured to generate a given set of control signals (not separately depicted) for controlling writes to the data storage unit 24, reads from the data storage unit 24, transfers of data to the REID analog circuit 20 for transmission via an RFID signal modulation, and transfers of read multimedia content to the modulator/transmitter 26 for transmission as an analog modulated RF signal from the transmitting antenna structure 28.

With continuing reference to FIG. 1, the controller 22 may be configured, or configurable via programming commands input through the RFID signal in, to receive signals from user interface structures that may be arranged on, for example, an exterior of the housing 12 and, in response, to generate control signals (not separately shown) to other functional units, as described in greater detail at later sections.

With continuing reference, the technology for implementing the data storage unit 24, as well as the selection of values for the capacity, access speed and other performance and function parameters of the data storage unit may be readily carried out by persons of ordinary skill in the relevant arts by applying conventional engineering design practices known to such persons to this disclosure. Example considerations, all readily seen by such persons, include, without limitation, the specific type(s) of multimedia content the particular device is intended to store, the amount of such multimedia content, the desired replay quality, the specified physical dimensions of the device, the target cost of the device, and the state of the memory technology extant at the time.

As will be readily understood, the choice of storage capacity for the data storage unit will also depend on whether or not the designer chooses to include a compression feature and, if so, which compression feature is used.

Preferably, for purposes of power conservation, the data storage unit 24 may be implemented by a non-volatile random access memory (NVRAM), using any available NVRAM technology.

As previously described, according to one aspect, example devices and methods according to the various exemplary embodiments include a locking feature so that a distributing entity may receive an unlocked device from a supplier, store a given multimedia content in the device, and then lock the device to prevent alteration of the stored content.

Referring to FIG. 1, the locking feature locking feature may be constructed using permanent fusible links in one or both of the controller 22 and the data storage unit 24, according to conventional fusible link and/or NVRAM technology or, as one alternative, by inserting a fusible link controlled logic gate (not separately shown) within a write enable (not separately shown) input of the data storage unit 24. FIG. 1 depicts the locking function of the controller unit 22 and the data storage unit 24 as their respective includes blocks 22*a* and 24*a*. These are only illustrative examples, and a wide variety of implementations of locking aspects according to exemplary embodiments will be obvious to persons of ordinary skill in the relevant arts upon reading this disclosure.

With continuing reference to FIG. 1, the depicted example analog modulated RF modulator/transmitter 26 includes a DAC (not separately shown) to convert multimedia files read from the data storage unit 24 by the controller 22 into an analog signal, and includes a carrier signal oscillator and modulator (not separately shown). The example analog modulated RF modulator/transmitter 26 modulates the carrier signal using, for example, conventional analog FM modulation circuit (not separately shown). The playback device may then be, for example, an automobile FM radio (not shown). The depicted example analog modulated RF modulator/transmitter 26 may further include an RF power amplifier (not separately shown) that connects to the depicted example transmission antenna 28.

Continuing to refer to FIG. 1, it will be understood that the RFID carrier frequency at which the RFID antenna structure 14 is intended to receive and transmit is the same, or proximal to the carrier frequency within the RF modulator/transmitter 26 such that the transmission antenna 28 and the RFID antenna structure may be implemented as a common structure. The broadcast band carrier wave and modulation such as, for example, FM transmission within the commercial broadcast UHF FM band.

As previously described, the playback device may, for example, be an automobile FM radio and the RF modulator/transmitter 26 configured accordingly. The transmitted analog modulated RF signal output by the RF modulator/transmitter 26 preferably has a power sufficient to carry the signal a distance of, for example, only a few meters. This will prevent the analog modulated RF signal by which devices according to the various embodiments transmit the playback multimedia signal to the user's playback device from interfering with other's playback devices, e.g., other driver's automobile-mounted FM radios.

Continuing to refer to FIG. 1, the example 10 may include mechanical user interface features such as, for example, a fast forward, skip and reverse button 30 and other, alternative or additional user interface mechanisms. The example 10 may also include an ON-OFF button such as the example 32

Figure 2:
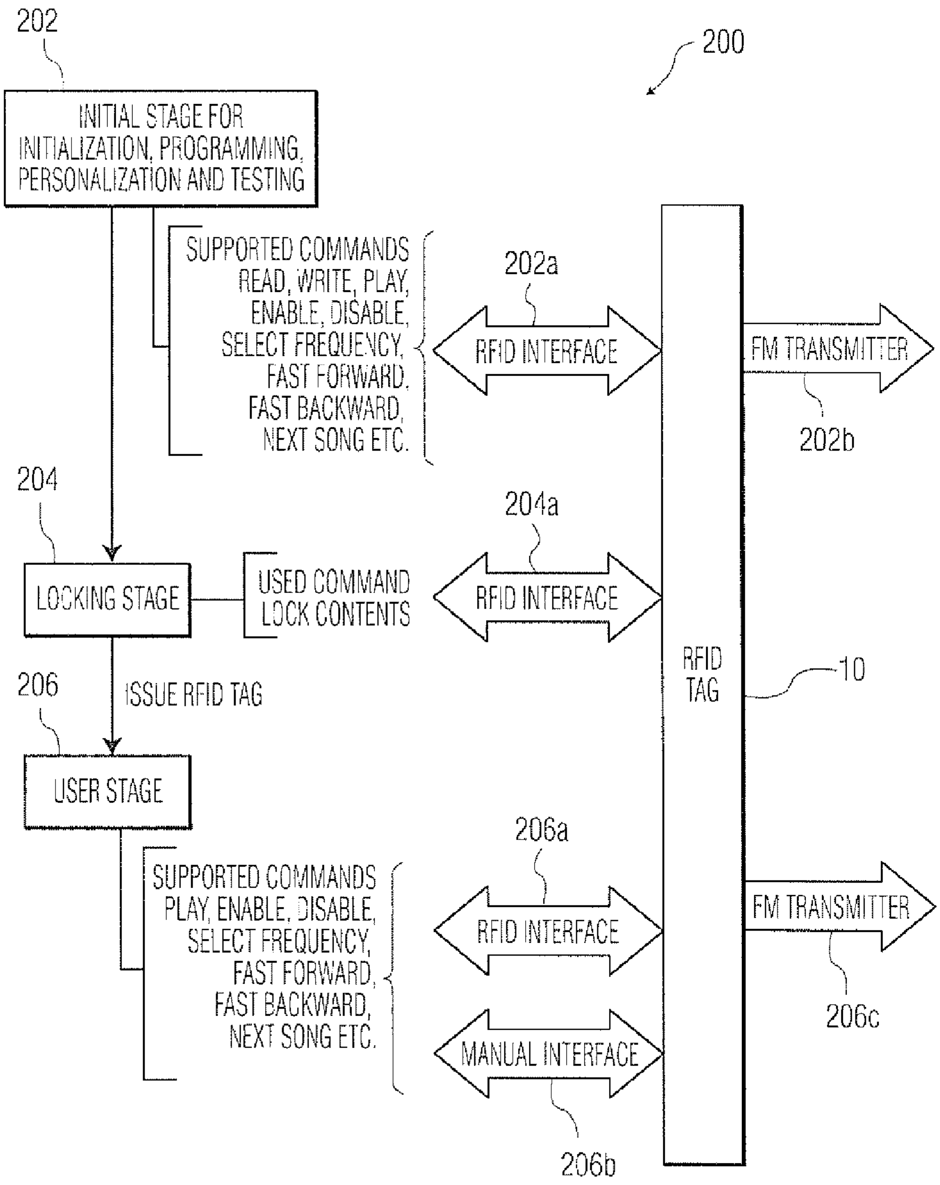
FIG. 2 shows one example graphical representation of various example operations for practicing one method according to one or more various exemplary embodiment.

FIG. 2 shows operations of method 200 according to one or more various exemplary embodiments. Operations and methods according to various exemplary embodiments, such as depicted at FIG. 2 may, but are not necessarily limited to being performed on the FIG. 1 example 10.

Referring to FIG. 2, at 202 an initialization may be performed at 202 to store multimedia, e.g., audio content in the device's data storage unit such as, for example, the data storage unit 24 of the FIG. 1 example 10. The initialization 202 may include a step of employing the device's RFID interface, such as the example step labeled as 202*a*, which may be, for example, performed through the RFID antenna 14 and RFID analog circuit 20 of the FIG. 1 example 10. The initialization may include testing of the write operation to the data storage and of the analog modulator/transmitter 26 and, for such testing, may include a step of using an FM transmitter interface of the device, such as the step labeled as 202*b*. Referring to the FIG. 1 example 10, step 202*b* may be performed by the analog modulator/transmitter 26 and transmitter antenna 28.

Continuing to refer to FIG. 2, after completion of the example initialization stage 202 the operation may proceed to a locking step 204. The detailed operations of the locking step 204 depend, in part, on the specific implementation of the locking means within the device. As previously described, one optional implementation may include, for example, fusible links within one or both of the controller 22 and the data storage unit 24. One illustrative example locking step 204 is therefore burning such fusible links (not shown). The burning may be performed by one or more of the fusible link burning technologies and methods known within the current fusible link arts. The burning may be performed by commands input to the device through the RFID interface, such the depicted step 204*a*.

With continuing reference to FIG. 2, after the example locking step 204 the device may be distributed to users, whereupon a user may carry out the user stage 206. Assuming the device has been locked at the locking stage 204, the user stage will not include altering the multimedia content of the device. It is contemplated that the user may have an RFID or equivalent interface features associated with, for example, the user's car radio and, therefore, the stage 206 operations may be performed, in whole or in part, using the RFID interface of the device, which is depicted as step 206*a*. In addition, the user stage 206 may include, as shown at step 206*b*, the user entering commands for the device to perform playback functions such as "Play," "Fast Forward," "Fast Reverse," "Skip to Next Song" and the like. Referring to FIG. 1, such commands may be entered through a manual user interface, such as the example button 30. The playback operations of stage 206 will also include the FM interface, as depicted at 206*c*.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention.

Accordingly, the foregoing disclosure, description, and figures are for illustrative purposes only and do not in any way limit the invention, which is defined only by the claims.

I claim:

1. A portable content playing device arranged within a housing, comprising:

a radio frequency identification (RFID) receiving and decoding circuit, coupled to an RFID antenna circuit, configured to receive a given RFID signal and generate corresponding RFID digital input data;

a control unit configured to retrievably store multimedia content, receive a given read command signal and, in response, select multimedia content from the stored multimedia content, and generate the selected multimedia content as playback multimedia data;

a digital-to-analog converter (DAC) configured to convert the generated playback multimedia data to an analog multimedia playback signal, wherein digital access to the stored multimedia content is permanently disabled after initialization;

a modulator/transmitter, coupled to a transmitter antenna circuit, configured to modulate a given radio frequency (RF) carrier signal by the analog multimedia playback signal, generate a corresponding modulated RF carrier signal, and transmit the generated modulated RF carrier signal from the transmitter antenna circuit; and a power supply configured to receive a given power input signal and generate a corresponding internal supply power to the RFID receiving and decoding circuit, the control unit, the DAC, and the transmitter wherein the control unit is configured to detect a write command in the RFID digital input data, detect multimedia content in the RFID digital input data, and retrievably store the detected multimedia content in accordance with the detected write command.

2. The portable content playing device of claim 1, wherein the control unit is configured to detect a given input lock signal and, in response to said detecting, switch from an unlocked state to a locked state, the unlocked state enabling the control unit to store the multimedia content and the locked state disabling the control unit from altering the stored multimedia content.

3. The portable content playing device of claim 1, wherein the modulator/transmitter comprises:

a carrier signal generator configured to generate the given RF carrier signal; and a frequency modulation (FM) modulator configured to FM modulate the generated carrier signal by the analog multimedia playback signal and generate a corresponding FM modulated carrier signal as the modulated RF carrier signal.

4. The portable content playing device of claim 3, wherein the control unit is configured to detect a given input lock signal and, in response, switch from an unlocked state to a locked state, the unlocked state enabling the control unit to store the multimedia content and the locked state disabling the control unit from altering the stored multimedia content.

5. The portable content playing device of claim 4, further comprising:

a battery configured to generate the power input signal; and a manually movable user interface arranged on an exterior surface of the housing; and an interface decoder configured to detect a motion of the manually movable user interface and generate a user command signal according to the detected motion, wherein the data control unit is configured to generate the read command signal according to the generated user command signal, the manually movable user interface and the interface decoder are configured to detect a given user movement as a command to select a carrier frequency for the transmitter, the data control unit is configured to generate a frequency select command signal in response to said detecting, and the transmitter is configured to set the carrier frequency in accordance with the generated frequency select command signal.

6. The portable content playing device of claim 3, further comprising:

a battery configured to generate the power input signal; and a manually movable user interface arranged on an exterior surface of the housing; and an interface decoder configured to detect a motion of the manually movable user interface and generate a user command signal according to the detected motion, wherein the control unit is configured to generate the read command signal according to the generated user command signal, the manually movable user interface and the interface decoder are configured to detect a given user movement as a command to select a carrier frequency for the transmitter, the control unit is configured to generate a frequency select command signal in response to said detecting, and the transmitter is configured to set the carrier frequency in accordance with the generated frequency select command signal.

7. The portable content playing device of claim 3, further comprising:

a receive power detector configured to detect external power received at the transmitter antenna and generate a corresponding power detection signal, wherein the modulator/transmitter is configured to set the carrier frequency in accordance with a frequency select command signal, and control unit is configured to receive the generated power detection signal and perform an available channel search by generating and iteratively varying the frequency select command signal and comparing the received power detection signal against a given channel availability criterion until the given channel availability criterion is met.

8. The portable content playing device of claim 7, wherein the RFID antenna circuit and the transmitter antenna circuit share a common radiating antenna element structure.

9. The portable content playing device of claim 8, wherein the common radiating antenna element structure is shaped and dimensioned for transmission and reception in the ultra high frequency (UHF) band.

10. The portable content playing device of claim 1, further comprising:

a battery configured to generate the power input signal; and a manually movable actuator arranged on an exterior surface of the housing and an interface decoder configured to detect a motion of the manually movable actuator and generate a user command signal according to the detected motion, wherein the control unit is configured to generate the read command signal according to the user command signal.

11. The portable content playing device of claim 1, further comprising:

a battery configured to generate the power input signal; and a manually movable user interface arranged on an exterior surface of the housing; and an interface decoder configured to detect a motion of the manually movable user interface and generate a user command signal according to the detected motion, wherein the control unit is configured to generate the read command signal according to the user command signal.

12. The portable content playing device of claim 1, wherein the control unit is configured to detect a read command in the RFID digital input data and, in response, generate the read command signal.

13. The portable content playing device of claim 1, further comprising:

a battery configured to generate the power input signal.

14. The portable content playing device of claim 1, wherein the control unit further comprises:

a Non-Volatile Random Access Memory (NVRAM).

15. The portable content playing device of claim 14, wherein the NVRAM is coupled to a permanent fusible link.

16. A portable content playing device arranged within a housing, comprising:

a radio frequency identification (RFID) receiving and decoding circuit, coupled to an RFID antenna circuit, configured to receive a given RFID signal and generate corresponding RFID digital input data;

a control unit configured to retrievably store multimedia content, receive a given read command signal and, in response, select multimedia content from the stored multimedia content, and generate the selected multimedia content as playback multimedia data;

a digital-to-analog converter (DAC) configured to convert the generated playback multimedia data to an analog multimedia playback signal, wherein digital access to the stored multimedia content is permanently disabled after initialization;

a modulator/transmitter, coupled to a transmitter antenna circuit, configured to modulate a given radio frequency (RF) carrier signal by the analog multimedia playback signal, generate a corresponding modulated RF carrier signal, and transmit the generated modulated RF carrier signal from the transmitter antenna circuit; and a power supply configured to receive a given power input signal and generate a corresponding internal supply power to the RFID receiving and decoding circuit, the control unit, the DAC, and the transmitter, wherein the control unit is configured to detect a write command in the RFID digital input data, detect multimedia content in the RFID digital input data, and retrievably store the detected multimedia content in accordance with the detected write command, and wherein the control unit is configured to generate RFID output data, the RFID receiving and decoding circuit is further configured to receive the generated RFID output data and generate a corresponding RFID transmitter output signal, and the RFID antenna circuit is further configured to transmit the generated RFID transmitter output signal, receive a given RFID signal, and generate corresponding RFID digital input data.

* * * * *